(12) United States Patent
Deng

(10) Patent No.: US 10,255,499 B2
(45) Date of Patent: Apr. 9, 2019

(54) HEAD-MOUNTED DISPLAY

(71) Applicant: HTC Corporation, Taoyuan (TW)

(72) Inventor: Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 63 days.

(21) Appl. No.: 15/466,868

(22) Filed: Mar. 23, 2017

(65) Prior Publication Data

US 2017/0277949 A1    Sep. 28, 2017

Related U.S. Application Data

(60) Provisional application No. 62/312,460, filed on Mar. 23, 2016.

(51) Int. Cl.
| | |
|---|---|
| *G06K 9/00* | (2006.01) |
| *G06F 1/16* | (2006.01) |
| *G06F 3/01* | (2006.01) |
| *H04N 5/00* | (2011.01) |
| *H04N 5/225* | (2006.01) |

(52) U.S. Cl.
CPC ......... *G06K 9/00604* (2013.01); *G06F 1/163* (2013.01); *G06F 3/013* (2013.01); *H04N 5/2254* (2013.01); *H04N 5/2256* (2013.01)

(58) Field of Classification Search
CPC ..... G06K 9/00604; G06F 1/163; G06F 3/013; H04N 5/2254
USPC ............................................................ 348/78
See application file for complete search history.

(56) References Cited

U.S. PATENT DOCUMENTS

| | | | |
|---|---|---|---|
| 2004/0150758 A1* | 8/2004 | Tomono | G02B 27/0172 349/11 |
| 2014/0361957 A1* | 12/2014 | Hua | G06F 3/013 345/8 |

FOREIGN PATENT DOCUMENTS

CN           204405948           6/2015

OTHER PUBLICATIONS

"Office Action of China Counterpart Application," dated Jan. 3, 2019, p. 1-p. 6.

* cited by examiner

*Primary Examiner* — Jeffery A Williams
(74) *Attorney, Agent, or Firm* — JCIPRNET

(57) ABSTRACT

A head-mounted display including a display, a first lens, at least one light source, at least one pinhole and at least one image sensor is provided. An eye ball observes the display by the first lens. The at least one light source emits at least one light beam to illumine the eye ball. The at least one pinhole is disposed outside a space between the display and the first lens. The at least one light beam reflected by the eye ball passes through the at least one pinhole to form an image on the at least one image sensor.

16 Claims, 4 Drawing Sheets

HEAD-MOUNTED DISPLAY

CROSS-REFERENCE TO RELATED APPLICATION

This application claims the priority benefits of U.S. provisional application Ser. No. 62/312,460, filed on Mar. 23, 2016. The entirety of the above-mentioned patent application is hereby incorporated by reference herein and made a part of this specification.

BACKGROUND OF THE INVENTION

Field of the Invention

The invention relates to a display. More particularly, the invention relates to a head-mounted display Description of Related Art head-mounted display is a type of equipment used to display pictures and colors and may interact with a user. Most of the time, the display is designed in a form of a pair of goggles or a helmet. The display is placed close to the eyes of the user, and magnifying lenses are adopted to adjust optical paths, such that images may be projected to the eyes within a short distance. An image with a wide viewing angle may be generated by the head-mounted display, and the viewing angle is generally greater than 90 degrees. An eye tracking element is usually disposed on the head-mounted display, and the eye tracking element is used by virtual reality software to track the viewing angle of the user to change the viewing point of three-dimensional scene. Nevertheless, in the prior art, an optical path of a light beam used to track the eye ball may be easily affected by other members of the head-mounted display, and the light beam thus is not well-imaged onto an image sensor of the eye tracking element. Consequently, the eye tracking element cannot function well.

SUMMARY OF THE INVENTION

The invention provides a head-mounted display with favorable performance.

A head-mounted display of the invention at least includes a display, a first lens, at least one light source, at least one pinhole and at least one image sensor. A user observes the display by the first lens. The at least one light source emits at least one light beam to illumine an eye ball of the user. The at least one pinhole is disposed outside a space defined by the display and the first lens. The at least one light beam reflected by the eye ball passes through the at least one pinhole to form an image on the at least one image sensor.

In an embodiment of the invention, the head-mounted display further includes a housing. The housing has a first opening and a second opening opposite to each other. The first lens and the display respectively cover the first opening and the second opening. The at least one pinhole is disposed outside the space surrounded by the first lens, the housing, and the display.

In an embodiment of the invention, the housing includes a first surface, a second surface opposite to the first surface and a side wall connected between the first surface and the second surface. The first surface has a first opening, and the second surface has a second opening. The head-mounted display further includes a member connected to the housing. The member at least includes a first portion member. The at least one pinhole is formed on the first portion member and protrudes from the first surface and the side wall of the housing.

In an embodiment of the invention, the member is a ring. The ring is fixed onto the first surface and exposes the first lens.

In an embodiment of the invention, the at least one light source is disposed on the ring.

In an embodiment of the invention, the member further includes a second portion member. The first portion member and the second portion member form an accommodating space. The at least one image sensor is disposed in the accommodating space of the ring.

In an embodiment of the invention, the head-mounted display further includes a second lens. The second lens is disposed in the accommodating space of the ring. The light beam effected by the eye ball passes through the at least one pinhole and the second lens sequentially to form an image on the at least one image sensor.

In an embodiment of the invention, the housing includes a first surface, a second surface opposite to the first surface and a side wall connected between the first surface and the second surface. The first surface has a first opening, and the second surface has a second opening. The at least one image sensor is disposed on the side wall of the housing.

In an embodiment of the invention, the head-mounted display further includes a second lens. The second lens is disposed outside the space and located between the at least one pinhole and the at least one image sensor. The at least one light beam reflected by the eye ball sequentially passes through the at least one pinhole and the second lens to form an image on the at least one image sensor.

In an embodiment of the invention, the head-mounted display further includes a processing unit electrically connected to at least one image sensor. The processing unit tracks at least one motion trajectory of the eye ball according to the image.

In an embodiment of the invention, the at least one light beam is an infrared ray.

In an embodiment of the invention, the first lens is a Fresnel lens.

In an embodiment of the invention, the at least one pinhole and the ring are integrally formed.

In an embodiment of the invention, the at least one pinhole is a lamina-shaped structure and is capable of being connected to the ring.

In an embodiment of the invention, the at least one image sensor is formed on the side wall.

In an embodiment of the invention, the head-mounted display further includes a second lens. The second lens is formed on the side wall and is disposed between the at least one pinhole and the at least one image sensor.

In an embodiment of the invention, the at least one light beam reflected by the eye ball sequentially passes through the at least one pinhole and the second lens to form an image on the at least one image sensor.

In view of the foregoing, in the head-mounted display provided by the embodiments of the invention, the image is formed on the image sensor according to the pinhole imaging theory, such that, regardless of the distances between the eye ball and the at least one pinhole, the image sensor can obtain the images with eye ball features of the same clarity. Thereby, even though there is variation of the distances between the at least one pinhole and the eye ball caused by problems such as process tolerance of the head-mounted display, the user's habit of wearing the device, or other factors, the images with eye ball features obtained by the at least one image sensor can still be clear enough to be conducive to performing eye tracking function. More importantly, the at least one pinhole is disposed outside the space defined by the display and the first lens, such that the light beam passing through the at least one pinhole is not deflected by the first lens and thus is well-imaged on the image sensor. As such, the head-mounted display with favorable eye tracking function is achieved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
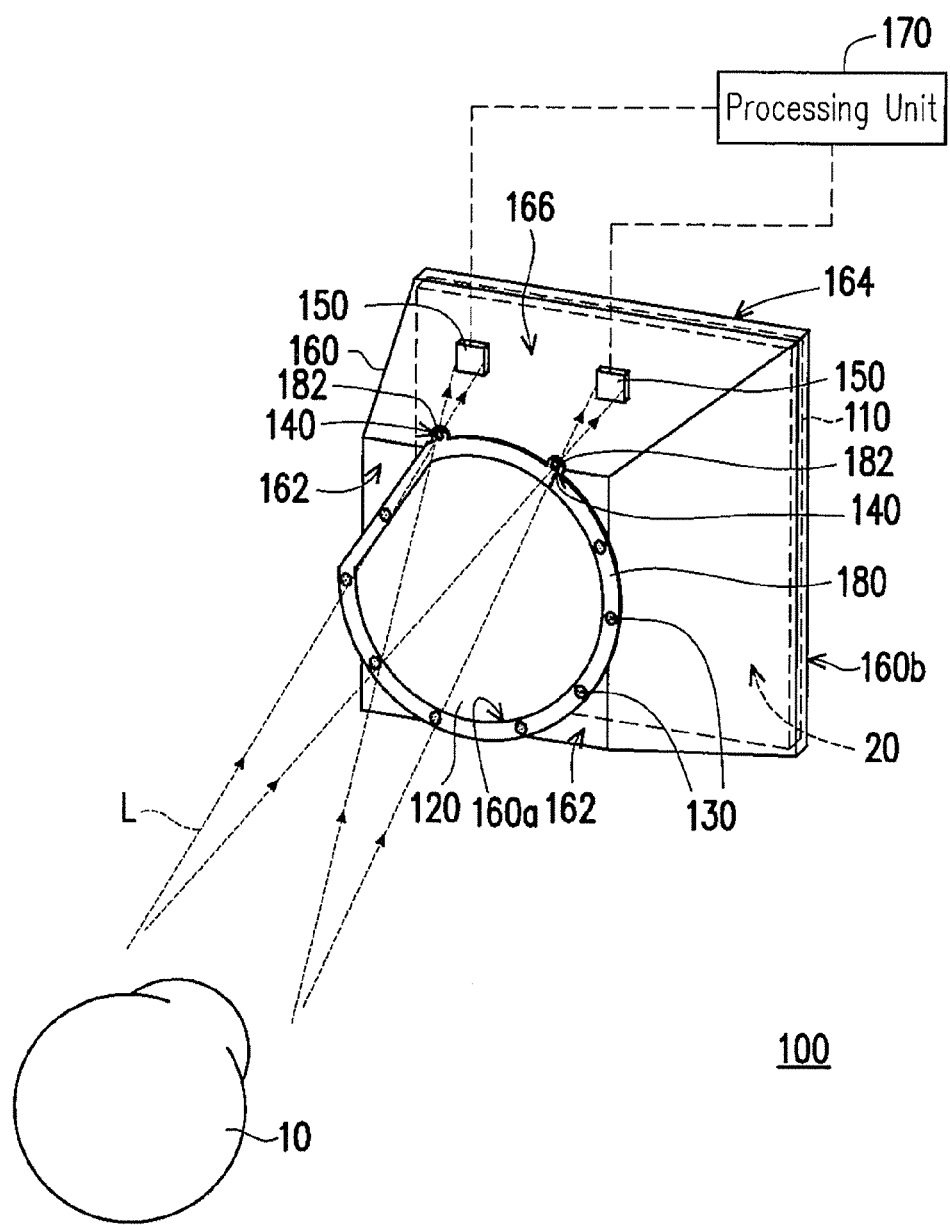
FIG. 1 is a schematic view of partial elements of a head-mounted display according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of partial elements of a head-mounted display according to an embodiment of the invention. Referring to FIG. 1, a head-mounted display 100 is configured to be observed by an eye ball 10. The head-mounted display (HMD) 100 at least includes a display 110, a first lens 120, a light source 130, a pinhole 140, and an image sensor 150. The first lens 120 is disposed between the display 110 and the eye ball 10. The eye ball 10 of a user observes a multimedia image presented on the display 110 by the first lens 120. Specifically, in the embodiment, the display 110 is configured to emit an image light beam (not shown), and the image light beam passes through the first lens 120 and is transmitted to the eye ball 10. The eye ball 10 is able to observe an enlarged virtual image through the first lens 120. In other words, the head-mounted display 100 may be applied in the virtual reality system, the augmented reality system, and/or the mixed reality system, but the invention is not limited thereto. Alternatively, in the embodiment, the first lens 120 may selectively be a Fresnel lens, such that the volume and the weight of the head-mounted display 100 may be reduced, but the invention is not limited thereto. In other embodiments, the first lens 120 may also be an optical element of other suitable types.

An appropriate distance between the display 110 and the first lens 120 may be maintained through a holder. For instance, in the embodiment, the holder may selectively be a housing 160 which is approximately shaped as a tube. The display 110 and the first lens 120 may be installed on opposite ends of the housing 160, such that the appropriate distance is maintained. Specifically, the housing 160 has a first surface 162 facing the eye ball 10, a second surface 164 opposite to the first surface 162, and a side wall 166 connected between the first surface 162 and the second surface 164. The first surface 162 has a first opening 160a, and the second surface 164 has a second opening 160b. The first lens 120 and the display 110 may respectively cover the first opening 160a and the second opening 160b.

The light source 130 is configured to emit a light beam to illumine the eye ball 10. Furthermore, the light beam L is configured to track a motion trajectory of the eye ball 10. Specifically, in the embodiment, an image with eye ball features may be formed on the image sensor 150 by the light beam L reflected by the features of the eye ball 10 (e.g., cornea and/or eye lens). The head-mounted display 100 may further include a processing unit 170 electrically connected to the image sensor 150. The processing unit 170 tracks the motion trajectory of the eye ball 10 according to the image with eye ball features. For instance, a positional relation, between feature points of the image with eye ball features captured by the image sensor 150 and a pupil, may be calculated by the processing unit 170 through algorithm, such that the function to track the motion trajectory of the eye ball 10 is achieved. In the embodiment, a non-visible light (e.g., an infrared (IR)) may be selected to act as the light beam L so as to prevent the light beam L configured to track the eye ball 10 from interfering effects of the display 110 when being observed by the eye ball 10. Nevertheless, the invention is not limited thereto.

In the embodiment, the head-mounted display 100 may selectively include a member 180 connected to the housing 160. The member 180 is, for example, a ring. The member 180 is fixed onto the first surface 162 of the housing 160 and exposes the first lens 120. In the embodiment, an inner side of the member 180 may have a first screw thread (not shown), and the housing 160 may have a second screw thread (not shown). The member 180 may be locked onto the housing 160 through the arrangement of the first screw thread and the second screw thread. Nevertheless, the invention is not limited thereto. In the embodiment, the light source 130 may be selectively disposed on the member 180 (e.g., a ring), but the invention is not limited thereto. In other embodiments, as long as the light beam L emitted by the light source 130 is able to illumine the eye hall 10, the light source 130 may be disposed on other suitable positions. Besides, the number and distribution of the light source 130 as shown in FIG. 1 are merely exemplary and should not be construed as limitations of the invention. In other embodiments, the number and distribution of the light source 130 may be appropriately designed according to actual requirement.

The pinhole 140 is disposed outside a space 20 defined by the display 110 and the first lens 120. The space 20 generally refers to a distributing space of an image light beam (not shown) emitted by the display 110 and may be transmitted to the first lens 120. Specifically, in the embodiment, the space 20 may refer to a space surrounded by the first lens 120, the housing 160, and the display 110. Nevertheless, the invention is not limited thereto. The light beam L reflected by the features of the eye ball 10 passes through the pinhole 140 to form the image with eye ball features on the image sensor 150. The features of the eye ball 10 are imaged on the image sensor 150 according to the pinhole imaging theory, such that, regardless of distances between the eye ball 10 and the pinhole 140, the image sensor 150 is still able to obtain the images with eye ball features of the same clarity.

Thereby, even though there is variation of the distances between the pinhole 140 and the eye ball 10 caused by problems such as process tolerance of the head-mounted display 100, a user's habit of wearing the device, or other factors, the image sensor 150 is still able to obtain the images with eye ball features which are clear enough to be conducive to the head-mounted display 100 to perform eye ball tracking function. More importantly, the pinhole 140 is disposed outside the space 20 defined by the display 110 and the first lens 120, such that the light beam L passing through the pinhole 140 is not deflected by the first lens 120 and thus is well-imaged on the image sensor 150. As such, the head-mounted display 100 is able to provide favorable eye ball tracking function.

In addition, optical applications applying pinhole imaging provided by the embodiments of the invention brings at least two more advantages. The pinhole 140 may be viewed as an aperture, and that a range of light entering may be limited. As such, the stray light on the eye ball 10 is prevented from entering into the image sensor 150, errors in eye ball tracking caused by misjudgment on a light point or a feature bright point may be reduced in subsequent algorithm during calculation. Furthermore, the light beam L is intersected and converged at the pinhole 140 before entering into the image sensor 150, such that, a distance between the eye ball 10 and the image sensor 150 may be increased through pinhole imaging. Problems such as excessively long focal length found in several types of image sensors may be solved, and flexibility and convenience in design may thus be further enhanced.

In the embodiment, the pinhole 140 may selectively be disposed on the member 180. A first portion member 182 with the pinhole 140 may protrude from the first surface 162 of the housing 160 and the side wall 166, such that the light beam L passing through the pinhole 140 is transmitted into the image sensor 150 disposed on the side wall 166. It is worth noting that the pinhole 140 and the image sensor 150 are disposed in a manner which is merely exemplary and should not be construed as limitations of the invention. In other embodiments, the pinhole 140 may also be disposed outside the space 20 defined by the display 110 and the first lens 120 through other methods, and the image sensor 150 may be disposed on other appropriate positions to be able to receive the light beam L passing through the pinhole 140. In the embodiment, the number of the image sensor 150 corresponds to the number of the pinhole 140. For instance, if the head-mounted display 100 includes a plurality of pinholes 140, the pinholes 140 respectively correspond to a plurality of image sensors 150. In the embodiment, the image sensor 150 is, for example, a charge-coupled device (CCD) or a complementary metal oxide semiconductor (CMOS) sensor, but the invention is not limited thereto.

Figure 2:
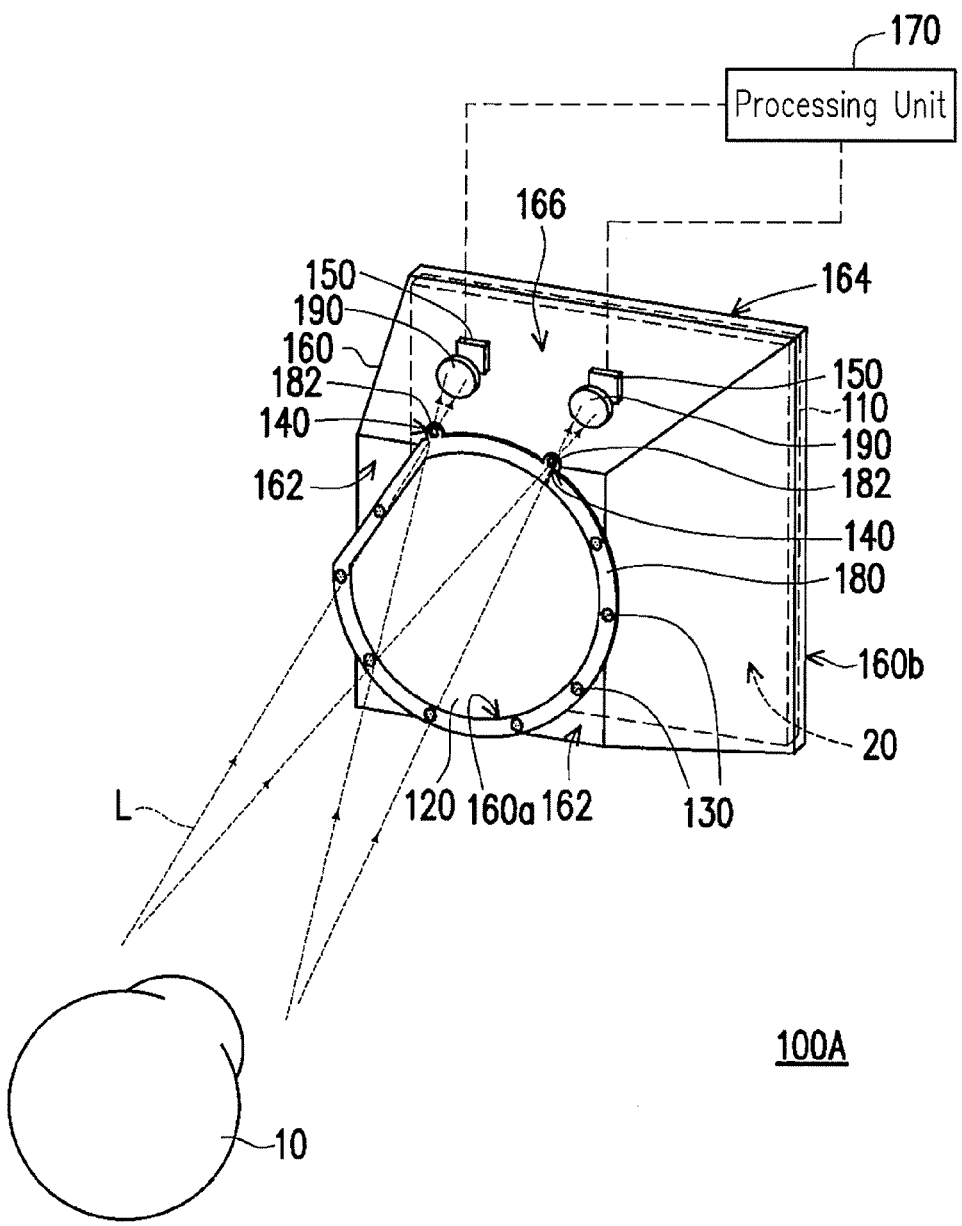
FIG. 2 is a schematic view of partial elements of a head-mounted display according to another embodiment of the invention.

FIG. 2 is a schematic view of partial elements of a head-mounted display according to another embodiment of the invention. Referring to FIG. 2, a head-mounted display 100A is similar to the head-mounted display 100. Thus, identical or corresponding elements are denoted by the same or corresponding reference numerals. Differences between the head-mounted display 100A and the head-mounted display 100 include that the head-mounted display 100A has an additional second lens 190 compared with the head-mounted display 100. Referring to the aforementioned description for identical or corresponding parts between the head-mounted display 100A and the head-mounted display 100, and the differences therebetween are described as follows.

Referring to FIG. 2, the head-mounted display 100A at least includes the display 110, the first lens 120, the light source 130, the pinhole 140, and the image sensor 150. The eye ball 10 observes the multimedia image presented on the display 110 by first lens 120. The light source 130 emits the light beam L to illumine the eye ball 10. The pinhole 140 is disposed outside the space 20 defined by the display 110 and the first lens 120. The light beam L reflected by the eye ball 10 passes through the pinhole 140 to form the image on the image sensor 150. Unlike the head-mounted display 100, the head-mounted display 100A further includes the second lens 190. The second lens 190 is disposed outside the space 20 and is located between the pinhole 140 and the image sensor 150. The light beam L reflected by the eye ball 10 passes through the pinhole 140 and the second lens 190 sequentially and is imaged on the image sensor 150. The light beam L passing through the pinhole 140 may be converged on the image sensor 150 by the second lens 190, such that a required distance between the pinhole 140 and the image sensor 150 may be shortened. In other words, overall structural design of the head-mounted display 100A may be more flexible through the addition of the second lens 190.

Figure 3:
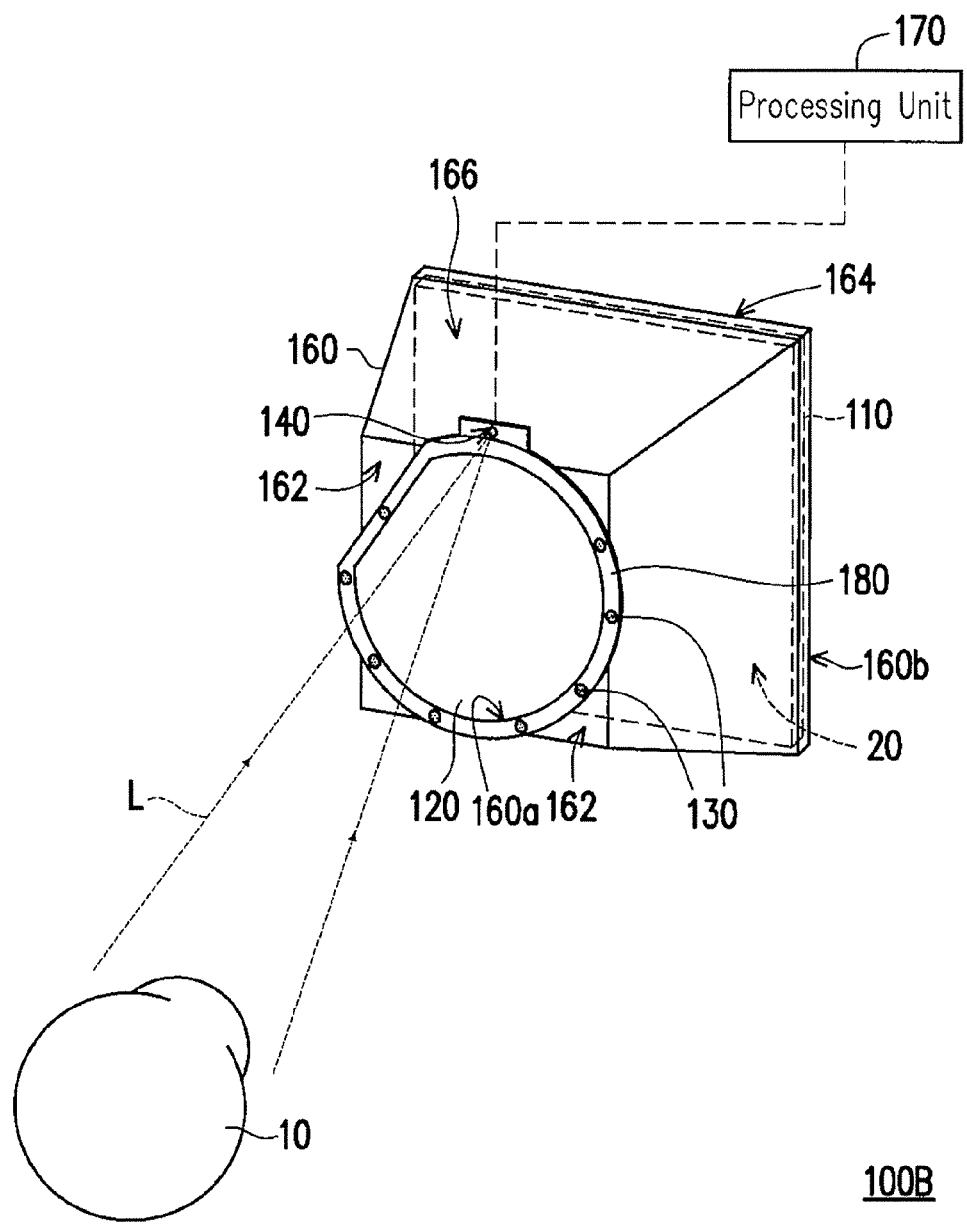
FIG. 3 is a schematic view of partial elements of a head-mounted display according to still another embodiment of the invention.
Figure 4:
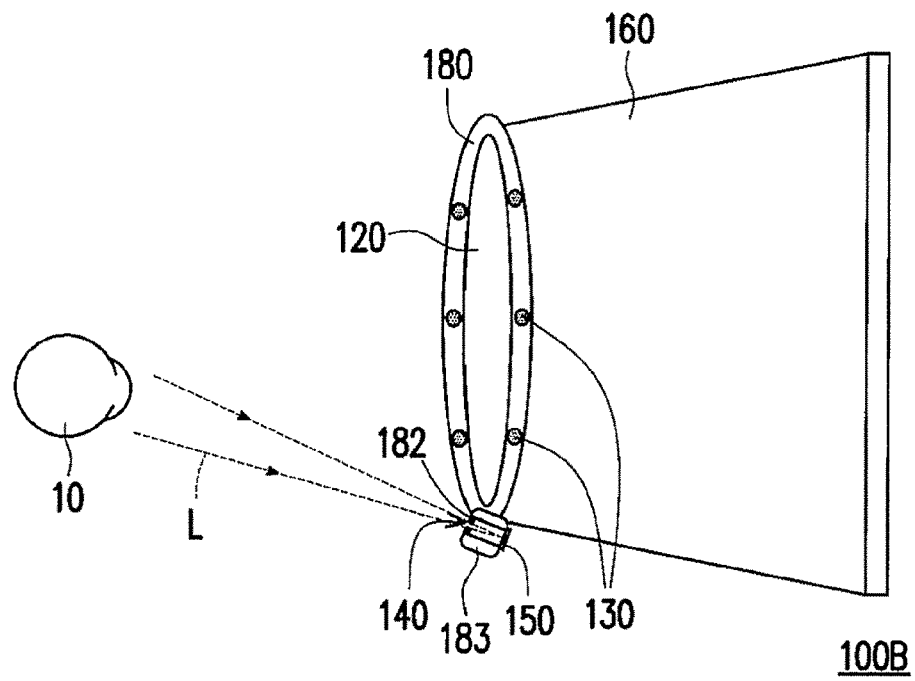
FIG. 4 is a side view of the partial elements of the head-mounted display in FIG. 3.

FIG. 3 is a schematic view of partial elements of a head-mounted display according to another embodiment of the invention. FIG. 4 is a side view of the partial elements of the head-mounted display in FIG. 3. Referring to FIG. 3 and FIG. 4, a head-mounted display 100B is similar to the head-mounted display 100. Thus, identical or corresponding elements are denoted by the same or corresponding reference numerals. Differences between the head-mounted display 100B and the head-mounted display 100 include that the light source 130, the pinhole 140, and the image sensor 150 of the head-mounted display 150 may all be disposed on the ring 180 to act as a single accessory to be used by different types of head-mounted displays. Specifically, an edge of the ring 180 of the head-mounted display 100B may have at least one second portion member 183. The second portion member 183 may form an accommodating space with the first portion member 182. In the embodiment, the accommodating space may be formed between the first portion member 182 and the second portion member 183. The accommodating space may be configured to at least accommodate the pinhole 140 and the image sensor 150. The pinhole 140 may be disposed on an end of the second portion member 183, and the image sensor 150 may be disposed on the other end of the second portion member 183 away from the eye ball 10. In practice, the pinhole 140, the second portion member 183, and the ring 180 may be integrally formed into a structure. Alternatively, the pinhole 140 may be disposed on an additional lamina-shaped structure (e.g., the first portion member 182 shown in FIG. 4 may also act as another member disposed outside the ring 180). The lamina-shaped structure may be connected to the ring 180, and that the accommodating space may generally be formed as an enclosed space. Understandably, a diameter of the pinhole 140 is less than the image sensor 150; nevertheless, in order to better explain the relation of relative position between the pinhole 140 and the image sensor 150, the pinhole 140 and the image sensor 150 are not illustrated based on actual proportion. In addition, identical or corresponding parts between the two have been specified above and thus will not be repeated hereinafter.

Figure 5:
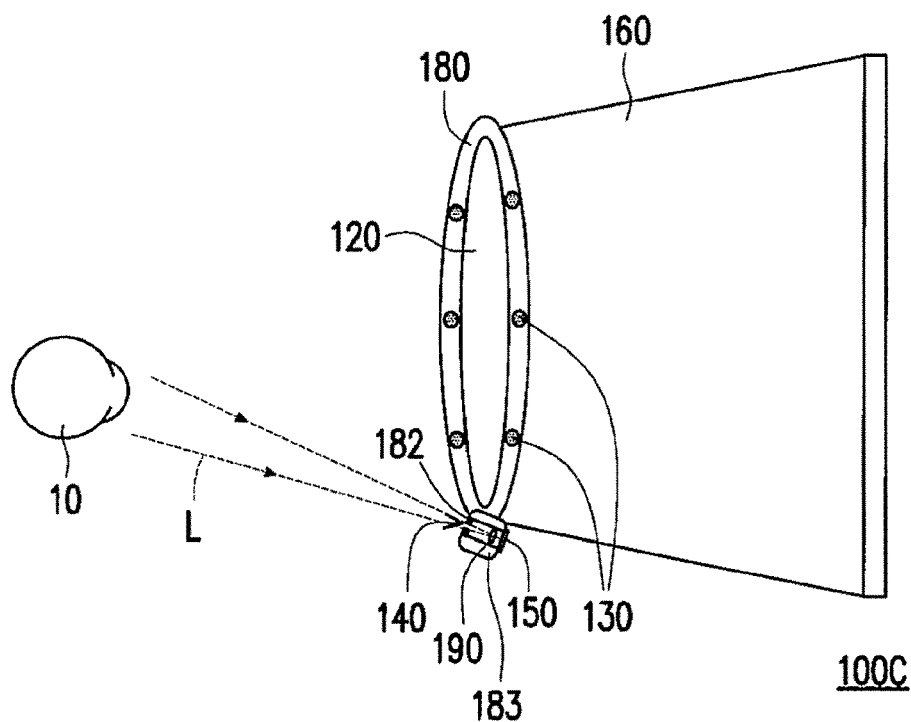
FIG. 5 is a schematic view of partial elements of a head-mounted display according to yet another embodiment of the invention.

FIG. 5 is a schematic view of partial elements of a head-mounted display according to yet another embodiment of the invention. Referring to FIG. 5, a head-mounted display 100C is similar to the head-mounted display 100A in FIG. 4. Thus, identical or corresponding elements are denoted by the same or corresponding reference numerals. Differences between the head-mounted display 100C and the head-mounted display 100A include that in the head-mounted display 100C, the light source 130, the pinhole 140, and the image sensor 150 and the second lens 190 may all be disposed on the ring 180 to act as a single accessory to be used by different types of head-mounted displays. Specifically, the ring 180 of the head-mounted display 100C at least includes the pinhole 140, the image sensor 150, and the second lens 190 disposed in the accommodating space. The light beam L reflected by the eye ball 10 passes through the pinhole 140 and the second lens 190 sequentially to form an image on the image sensor 150. In addition, identical or corresponding parts between the two have been specified above and thus will not be repeated hereinafter.

To sum up, the head-mounted display provided by an embodiment of the invention at least includes the display, the first lens, the light source, the pinhole, and the image sensor. The eye ball observes the display by the first lens. The light source emits the light beam to illumine the eye ball. The pinhole is disposed outside the space defined by the display and the first lens. The light beam reflected by the eye ball passes through the pinhole to form an image on the image sensor.

Particularly, the features of the eye ball are imaged on the image sensor according to the pinhole imaging theory, such that, regardless of the distances between the eye ball and the pinhole, the image sensor may obtain the images with eye ball features of the same clarity. Thereby, even though there is variation of the distances between the pinhole and the eye ball caused by problems such as process tolerance of the head-mounted display, the user's habit of wearing the device, or other factors, the images with eye ball features obtained by the image sensor may still be clear enough to be conducive to performing eye tracking function.

More importantly, the pinhole is disposed outside the space defined by the display and the first lens, such that the light beam passing through the pinhole is not deflected by the first lens and thus is well-imaged on the image sensor. As a result, the head-mounted display with favorable eye-tracking effect can be achieved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A head-mounted display, configured to provide a multimedia image, the head-mounted display at least comprising:
    a display;
    a first lens, wherein a user observes the display by the first lens;
    at least one light source, emitting at least one light beam to illumine an eye ball of the user;
    at least one pinhole, disposed outside a space defined by the display and the first lens;
    at least one image sensor, wherein the at least one light beam reflected by the eye ball passes through the at least one pinhole to form an image on the at least one image sensor;
    a housing, having a first opening and a second opening opposite to each other, wherein the first lens and the display respectively cover the first opening and the second opening, and the at least one pinhole is disposed outside the space surrounded by the first lens, the housing and the display; and
    a member, connected to the housing, wherein the member at least comprises a first portion member, and the at least one pinhole is formed on the first portion member.

2. The head-mounted display as claimed in claim 1, wherein the housing comprises a first surface, a second surface opposite to the first surface, and a side wall connected between the first surface and the second surface, the first surface has the first opening, the second surface has the second opening, and
    the first portion member protrudes from the first surface and the side wall of the housing.

3. The head-mounted display as claimed in claim 1, wherein the member is a ring, and the ring is fixed onto the first surface of the housing and exposes the first lens.

4. The head-mounted display as claimed in claim 3, wherein the at least one light source is disposed on the ring.

5. The head-mounted display as claimed in claim 3, wherein the member further comprises:
    a second portion member, the first portion member and the second portion member forming an accommodating space, the at least one image sensor being disposed in the accommodating space of the ring.

6. The head-mounted display as claimed in claim 5, further comprising:
    a second lens, disposed in the accommodating space of the ring, wherein the at least one light beam reflected by the eye ball sequentially passes through the at least one pinhole and the second lens to form the image on the at least one image sensor.

7. The head-mounted display as claimed in claim 1, wherein the housing comprises a first surface, a second surface opposite to the first surface and a side wall connected between the first surface and the second surface, the first surface has the first opening, the second surface has the second opening, and the at least one image sensor is disposed on the side wall of the housing.

8. The head-mounted display as claimed in claim 1, further comprising:
    a second lens, disposed outside the space and located between the at least one pinhole and the at least one image sensor, wherein the at least one light beam reflected by the eye ball sequentially passes through the at least one pinhole and the second lens to form the image on the at least one image sensor.

9. The head-mounted display as claimed in claim 1, further comprising:
    a processing unit, electrically connected to the at least one image sensor, wherein the processing unit tracks at least one motion trajectory of the eye ball according to the image.

10. The head-mounted display as claimed in claim 1, wherein the at least one light beam is an infrared ray.

11. The head-mounted display as claimed in claim 1, wherein the first lens is a Fresnel lens.

12. The head-mounted display as claimed in claim 6, wherein the at least one pinhole and the ring are integrally formed.

13. The head-mounted display as claimed in claim 6, wherein the at least one pinhole is a lamina-shaped structure and is capable of being connected to the ring.

14. The head-mounted display as claimed in claim 2, wherein the at least one image sensor is formed on the side wall.

15. The head-mounted display as claimed in claim 14, further comprising:

a second lens, the second lens being formed on the side wall and being disposed between the at least one pinhole and the at least one image sensor.

16. The head-mounted display as claimed in claim 15, wherein the at least one light beam reflected by the eye ball sequentially passes through the at least one pinhole and the second lens to form the image on the at least one image sensor.

\* \* \* \* \*